United States Patent [19]

Powers

[11] 4,072,438
[45] Feb. 7, 1978

[54] INSERT TYPE DRILL AND INSERT THEREFOR

[75] Inventor: Thomas R. Powers, Rogers, Ark.

[73] Assignee: TRW Inc., Cleveland, Ohio

[21] Appl. No.: 708,836

[22] Filed: July 26, 1976

[51] Int. Cl.$^2$ .................. B23B 29/03; B26D 1/00; B26D 1/12

[52] U.S. Cl. .................. 408/59; 408/199; 408/211; 408/239 R; 407/11; 407/42; 407/103; 407/115

[58] Field of Search .............. 408/59, 144, 186, 199, 408/226–231, 233, 239, 211; 29/105 R, 105 A, 103 A

[56] References Cited

U.S. PATENT DOCUMENTS

| | | | |
|---|---|---|---|
| 3,027,786 | 4/1962 | Severson | 408/197 |
| 3,138,043 | 6/1964 | Greuner | 408/59 |
| 3,158,922 | 12/1964 | Reese | 29/105 R |
| 3,422,706 | 1/1969 | Lunsford | 408/59 |
| 3,791,660 | 2/1974 | Bostley | 408/59 |
| 3,816,018 | 6/1974 | Hlocky | 408/59 |

Primary Examiner—Leonidas Vlachos
Attorney, Agent, or Firm—Daniel G. Blackhurst

[57] ABSTRACT

A single flute drill having a single, replaceable cutting insert which can drill from the solid, as well as being used for other single point machining operatings such as turning, internal and external diameter boring, contouring and facing. The insert is configured and related to the drill body so as to provide a single, radially extending cutting edge which has an effective neutral rake and negative lead. A specific insert structure is also provided for use in the drill. The disclosed insert comprises a solid body having parallel upper and lower faces each generally in the shape of an equilateral parallelogram and joined along their peripheral edges by side walls. One cutting edge is formed along the juncture of one side wall and the upper face and is inclined along its length toward the lower face. A second cutting edge is formed along the juncture of the lower face and a second side wall which intersects the first side wall at a corner. The second cutting edge is inclined along its length from the corner of the intersection toward the upper face.

13 Claims, 9 Drawing Figures

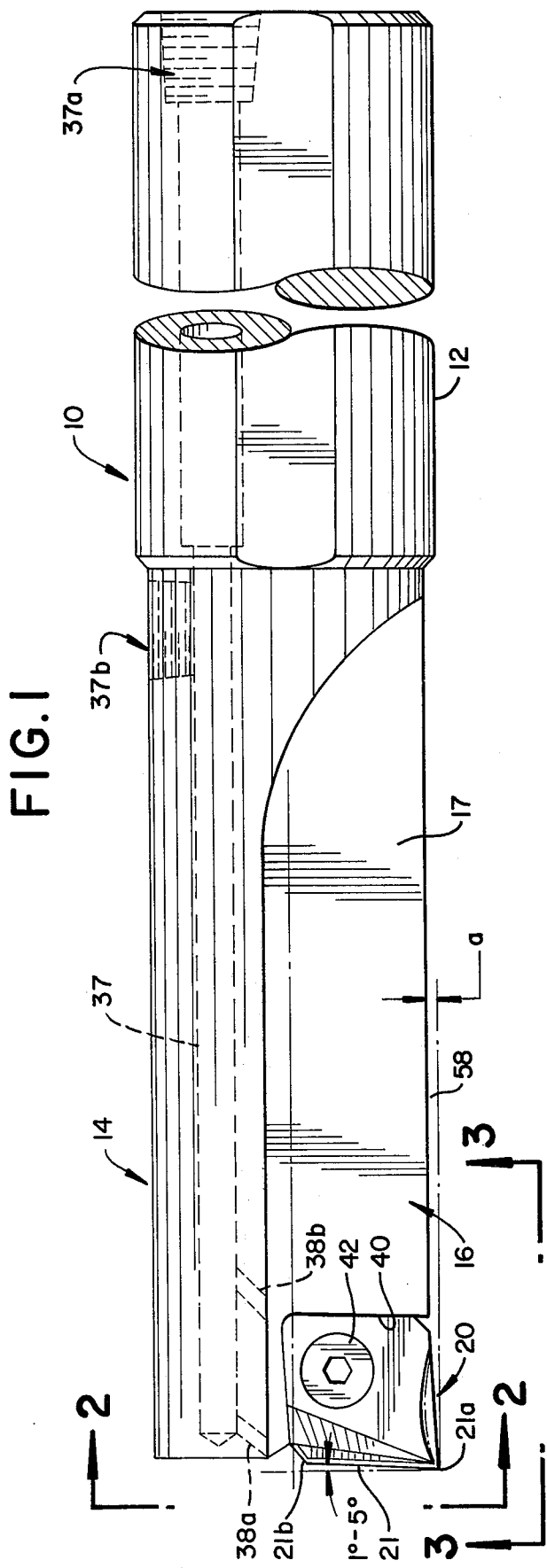
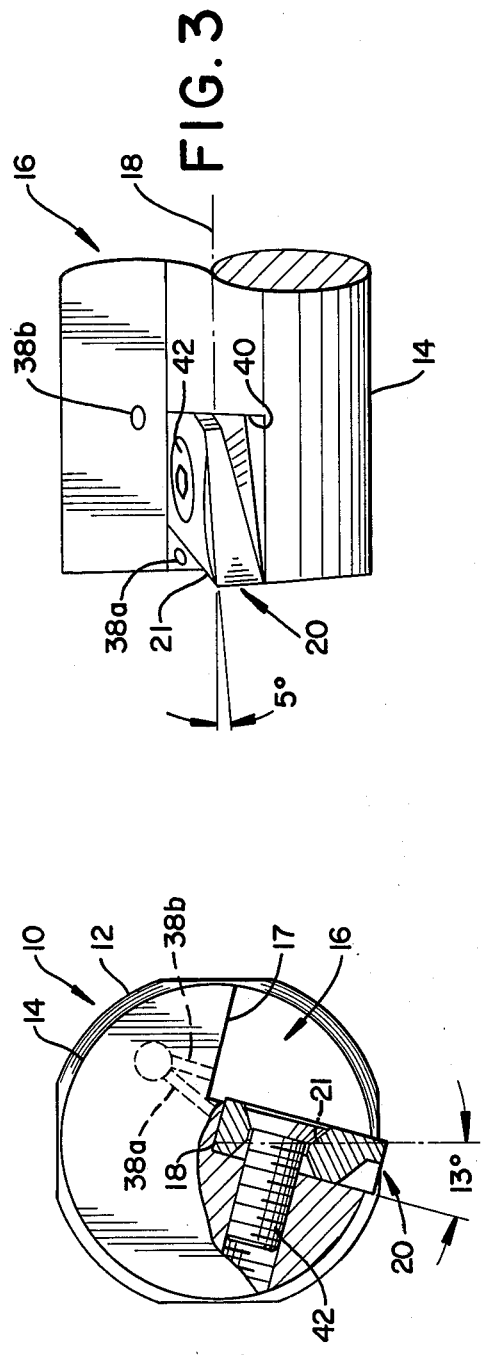

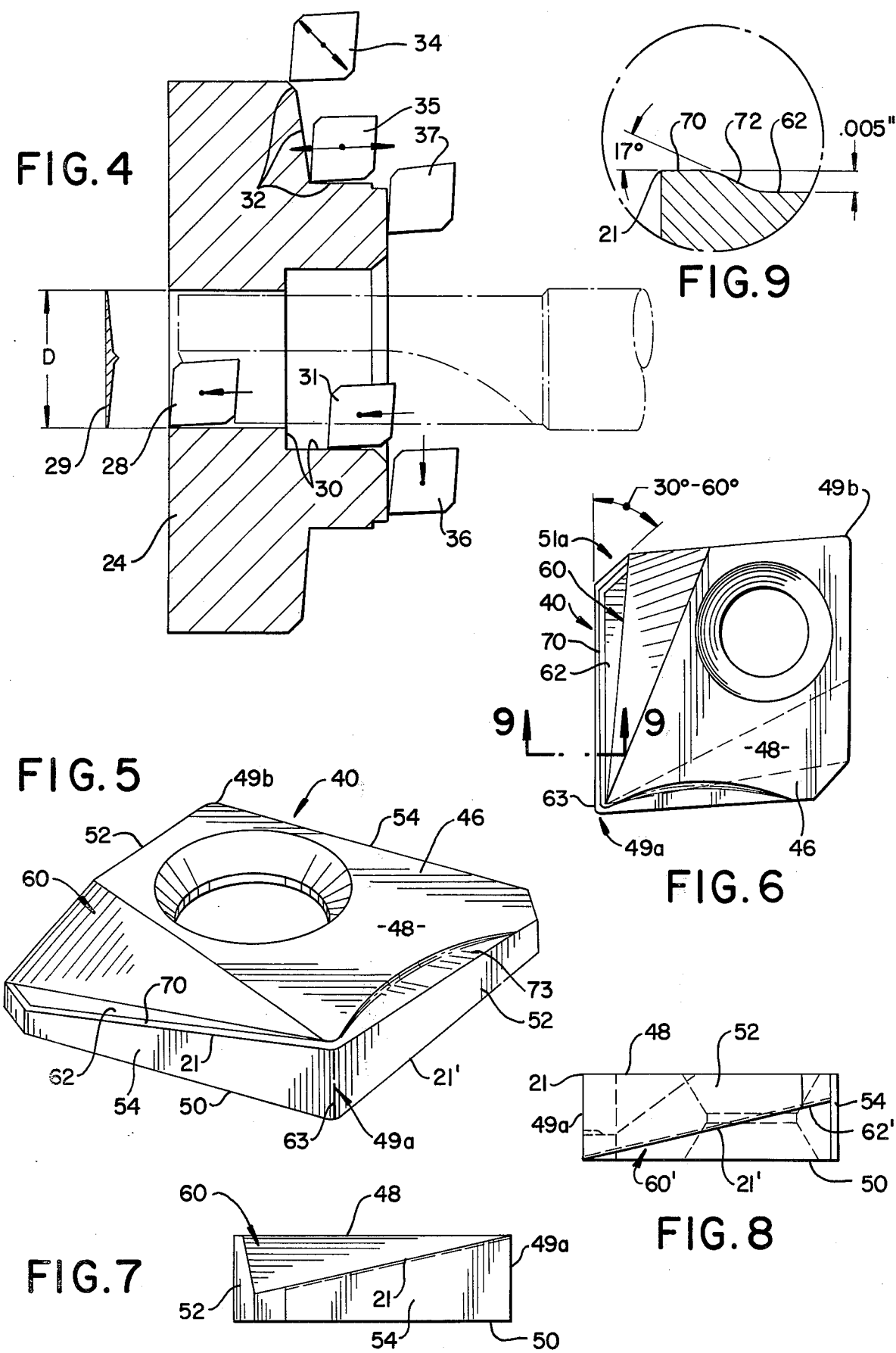

INSERT TYPE DRILL AND INSERT THEREFOR

BACKGROUND OF THE INVENTION

The subject is directed toward the art of metal removal cutting tools and, more particularly, to an improved drill capable of drilling from the solid in steel as well as, performing other single point metal removal operations such as boring, contouring and facing.

The invention is particularly suited for embodiment in a structure which uses carbide inserts as the cutting element and will be described with reference thereto; however, the invention can be embodied in structures which use other materials or inserts as the cutting element.

Carbide has long been recognized as a particularly suitable material for use in cutting tools for metal removal operations. Most current uses of carbide for cutting involve the use of a tool support body or holder which carries one or more small carbide elements or inserts which define the cutting edges. These type of cutting tools have achieved widespread acceptance for a variety of operations including boring, milling, facing and contouring. However, attempts at using this general construction for tools capable of drilling steel or ferrous materials from the solid (as distinguished from enlarging a previously drilled hole) have not been particularly successful. Tools allegedly capable of performing this general function are shown in U.S. Pat. Nos. 3,422,706 to Lunsford and 3,540,323 to Rishel. The drills shown in these patents are for all intents single purpose and cannot perform other machining operations to the extent desirable.

BRIEF DESCRIPTION OF THE INVENTION

The subject invention provides a drill structure which can be constructed to use only a single carbide indesable insert and which is capable of drilling from the solid in a variety of materials. In addition, drills formed in accordance with the invention can perform several other machining operations. For example, turning, boring, facing and contouring are possible.

In particular, the subject invention contemplates a drill structure which preferably comprises an elongated, relatively rigid and generally cylindricaL body having at least one flute defining slot or groove extending a substantial distance longitudinally of the body from one outer end thereof. A cutting insert is mounted at the outer end of the groove. The insert is configured and related to the body to define a single, continuous cutting edge which extends from the axis of the body angularly to a point spaced a slight distance radially outwardly of the body. Additionally, the insert is shaped and positioned to provide both negative lead and effective neutral rake throughout the length of the cutting edge.

Preferably, but not necessarily, the insert is positioned to provide a negative lead in the range of 1° to 5° throughout substantially the entire cutting edge. However, in the area of the edge closely adjacent to the centerline of the body, it has been found highly desirable to provide a short section of the edge with a much greater lead of from 30° to 60°.

The described drill has been found capable of drilling from the solid in a variety of metals, including hard and soft steel, cast iron, and most nonferrous metals. The single flute, single indesable insert design results in substantial cost savings. In addition, as will subsequently be explained, the ability of the drill to be used for other machining functions reduces the number of tool stations required for other machining operations.

Accordingly, a primary object of the invention is the provision of an insert type drill which has the ability to drill from the solid in a variety of metals, the major being ferrous metals.

A further object of the invention is the ability to machine ferrous materials at three to four times the speed obtainable with conventional high speed drill cutting bodies.

Another object is the provision of a drill of the general type described which can be used for many different machining operations including turning, boring, facing and contouring.

A further object is the provision of a drill which can perform the noted operations with only one indesable cutting insert.

Yet another object is the provision of a drill of the general type discussed in which the insert can be indexed to provide a plurality of usable cutting edges.

Another object is the provision of an indesable cutting insert which can be formed from tungsten carbide and is particularly suitable for use in a drill of the type described.

BRIEF DESCRIPTION OF THE DRAWINGS

The above and other objects and advantages will become apparent from the following description when read in conjunction with the accompanying drawings wherein:

FIG. 1 is a side elevation view of an insert type drill embodying the invention;

FIG. 2 is a view looking at the left end of the drill of FIG. 1;

FIG. 3 is a view taken on line 3—3 of FIG. 1;

FIG. 4 is a diagrammatic view showing the manner in which the drill of FIG. 1 can be used for performing machining operations in addition to drilling;

FIG. 5 is a pictorial view showing a preferred form of insert for use in the drill of FIG. 1;

FIG. 6 is a top plan view of the insert of FIG. 5;

FIGS. 7 and 8 are views taken on lines 7—7 and 8—8, respectively, of FIG. 6; and, FIG. 9 is a greatly enlarged cross-sectional view taken on line 9—9 of FIG. 6 showing the chip breaker edge configuration.

DETAILED DESCRIPTION OF THE PREFERRED EMBODIMENT

Referring more particularly to the drawings wherein the showings are for the purpose of illustrating preferred embodiments of the invention only and not for the purpose of limiting same, FIGS. 1 through 3 show the overall arrangement of an insert type drill formed in accordance with the subject invention. In particular, the illustrated drill comprises a main body 10, formed from steel or any suitable material capable of providing the required strength and rigidity. The body 10 has a generally cylindrical shape and includes a mounting or shank end section 12 and a drill or cutting end section 14.

Extending axially inwardly of the body from the left hand end section 14 (as viewed in FIG. 1) is a recess or groove 16 which defines a single, straight flute 17. The groove 16 has, as best shown in FIG. 2, a generally V-shaped cross-section in planes perpendicular to the longitudinal axis 18 of the body 10. Additionally, flute 17 extends radially into section 14 a distance at least substantially equal to the radius of section 14. In order to assure sufficient rigidity, the flute 17 should preferably be no larger than necessary to provide sufficient space for proper chip flow.

Mounted at the left hand end of Flute 17 is an indexable type hard insert 20 formed of tungsten carbide or the like. According to the subject invention, the insert 20 is contoured and/or related to the end of the cutting shank portion 14 such that its cutting edge 21 extends continuously throughout a distance of from at least the center axis 18 to slightly beyond the maximum radial extent of section 14. As best shown in FIG. 2, the cutting edge 21 lies exactly on a radius of section 14. Additionally, the insert 20 is contoured or positioned so as to provide back clearance behind the radial outer corner 21a of the cutting edge 21. This is best seen in FIG. 2.

Even more important than the location of the cutting edge are the relationships best illustrated in FIGS. 1 and 3. In particular, the insert 20 is contoured and/or located such that the cutting edge 21 has or provides the drill with a negative lead. That is, the radially outermost corner 21a of the cutting edge is located axially outwardly of the end of the shank portion 14 a greater distance than the radial inner end 21b of the edge. The amount of negative lead could vary somewhat, however, according to the subject embodiment, the negative lead preferably is in the range of approximately 1° to 5°. In addition to the negative lead, the insert is preferably positioned such that the cutting edge 21 has an effective neutral cutting rake.

As mentioned earlier, the maximum radial extent of the cutting edge 21 is slightly greater than the maximum radial extent of the cutting end section 14 of body 10. As shown in FIG. 1, the outer corner 21a thus provides clearance for end section 14. Preferaby, a clearance "a" should be kept to a minimum to prevent chips from packing between the end section 14 and the wall of the hole being machined when the tool is being used as a drill.

It has been found that the described relationship of a single insert having the noted negative lead and neutral rake permits the drill to drill a hole from the solid in steels, as well as, other ferrous and non-ferrous metals and alloys. In addition, the relationship permits the drill to be used for a variety of machining operations in addition to drilling. For example, FIG. 4 illustrates how the drill could be used in a static, non-rotating condition in a conventional, numerically controlled or automatic chucking machine. In this figure a cross section of the work piece is shown and identified with the reference numeral 24. To perform a drilling operating the drill is simply moved axially into the counter clockwise rotating work piece 24 as shown at location 28. As the drill moves through the work piece it will, of course, drill a hole at a diameter D which is generally equal to twice the maximum radial extent of the cutting edge 21. As the drill emerges from the left hand side of the work piece 24, a segment having the configuration illustrated typically at 29 immerges from the work piece. By positioning the drill transversely to the axis as shown at position 31 and feeding it into the work piece it is possible to counter-bore as illustrated by the lines 30. Similarly, contouring of the inner surfaces can likewise be accomplished. It is important to note that the negative lead provide the capability to single point the bottom wall of the previously machined counterbore perpendicular to the axis of work piece rotation.

By reversing the direction of the work piece, the outside diameter can be contoured or chamferred as shown by reference lines 32 merely by moving the drill to the positions illustrated at 34 through 35. Facing can likewise be accomplished by moving the drill to positions 36 or 37 and, based on spindle rotation, causing it to feed in a generally perpendicular direction relative to the axially rotation of the work piece. (Note that positions 34, 35 and 37 require the work piece to rotate in the clockwise direction as viewed from the right end in FIG. 4. Positions 28, 31 and 36 require counterclockwise work piece rotation.)

The ability of the drill to perform a variety of metal removal operations is particularly desirable since it allows a plurality of stock removal machining functions to be carried out at a single work station without a tooling or machine station change. It is also important to note that all machining cuts are performed with the same single insert.

An adequate supply of coolant to the cutting edge 21 is comparatively important with the subject type of drill. For this reason, the body 10 (see FIGS. 1–3) is provided with a longitudinally extending coolant supply passage 37. Passage 37 has a pair of inlet ports 37a and 37b. Either of the ports can be used for coolant supply depending upon the type of machine on which the drill is mounted. The non-used port is, of course, merely plugged. Discharge from passage 37 is through two outlet ports 38a and 38b. Outlet port 38a is angled as shown to direct coolant flow at the radially inner end 21b of cutting edge 21. Preferably, the coolant is supplied at a comparatively high pressure to assist in moving the chips away from the part. Coolant flow in this area is important since the cutting edge adjacent to the center axis namely 21b approaches a cutting speed of zero surface feet per minute. Outlet port 38b is positioned to direct coolant at the outer radial end 21a of the cutting edge 21. A good flow of coolant in this area is also important especially when the drill is being used for turning, facing and contouring operations.

While it is apparent that many different insert configurations could be used provided they were capable of assuring the relationships discussed above, the subject invention preferably incorporates an insert having the configuration best seen in FIGS. 5 through 8. This particular insert configuration allows the insert to be mounted in the drill in a retaining pocket 40 machined in the end groove 16 and having a bottom wall and a pair of side walls which join the bottom wall at a 90° angle. This 90° angle relationship permits the insert to be rigidly locked in the pocket through the use of a simple removable connecting means such as a screw 42. Additionally, the top surface of the insert shown can join the bottom surface of the flute 17 with a smooth transition for proper chip flow.

In the description of the indexible insert which follows, terms such as upper and lower will be used merely for the sake of clarity. These terms are not, however, to be considered as limiting the manner in which the indexable insert is used or related to the drill shank or recess 16.

Referring in particular to FIGS. 5 through 8 the insert 40 is shown as comprising a solid, unitary body 46 of any hard material suitable for cutting tools such as tungsten carbide or the like. In general, the body 46 includes upper and lower spaced, generally parallel, faces 48 and 50. The faces 48 and 50 are joined about their peripheral edges by vertically extending opposed pairs of side walls 52 and 54, respectively.

As shown in FIGS. 5 and 6, the body 46 has a configuration which is the shape of an equilateral parallelogram in planes parallel to the upper and lower faces 48 and 50. The angles of the acute corners 49a and 49b must be selected so as to provide the required negative lead discussed with reference to FIG. 1, as well as, a clearance "a" at 58 in FIG. 1. Generally the inclined angles of the acute corners of the parallelogram will or should be in the range of 83° to 88° to produce the required or desired angle ranges for lead and clearance. Additionally, as shown the acute angle corner 49a is preferably given a slight radius in the range of 1/32 inch so as to improve the cutting action when used for drilling as well as single point cutting operations.

Extending into the body 46 along the juncture of one side wall 54 and the top face 48 is a groove or recess 60. The groove 60 begins at approximately the top of the acute corner 49a and is inclined downwardly to the opposite end of the respective side wall 52. The groove 60 terminates in a bottom wall 62. The juncture between the groove's bottom wall 62 and the side wall 54 defines the cutting edge 21.

The end portion of the cutting edge 21 in the area adjacent to the obtuse corner 51a is chamferred at an angle in the range of 30° to 60°. This provides a better distribution of forces acting on the corner and reduces the possibility of failure of the cutting edge in this area. Additionally, the surface under the cutting edge at corner 51a is provided with an incline of approximately 4° to 8° to assure cutting clearance.

The end of the cutting edge at the acute corner 49a preferably has a small radius 63 to improve the cutting action for drilling or when it is functioning as a single point tool as described earlier. Also, the cutting edge in this area is a smooth transition from the juncture of surfaces or walls 62, 70, 54 to the juncture of face 48 and wall 52.

In order to improve the cutting action a chip breaking or control configuration is required. However, it should be noted that various configurations could be used based on material being a machined. As shown a short, flat surface 70 extends back from edge 21 a distance of approximately 0.02 inch. The surface 70 in joined to the bottom wall 62 of groove 60 by a wall 72 which is inclined as shown. This typical configuration produces proper chip formation and improves the cutting action of the insert.

In order to control the chip breaking requirements for facing operations, an additional chip breaker configuration 73, which shown at the juncture of surface 48 and wall 52, from the acute corner 49a is provided.

The insert shown is designed to provide a second cutting edge which can be indexed into cutting position by inverting and rotating the insert. For this reason, a second cutting edge 21' is formed generally at the juncture of one side wall 52 and a groove 60' formed in bottom face 50. The second cutting edge is effectively identical to the first and is positioned such that the insert 46 is symmetrical relative to a vertical plane which includes corners 49a and 49b. Consequently, the various surfaces which form the second cutting edge are identified with numerals identical to those which identify the corresponding surfaces forming the first cutting edge.

Because of the design of the insert it is possible to have a single insert provide two separately usable cutting edges, while retaining the smooth transition from the top surface of the insert to the surface of the flute.

Having thus described by invention, I claim:

1. A drill useful for performing a variety of metal removal operations comprising:
   an elongated, generally cylindrical body having a longitudinal axis and terminating in first and second axially opposed ends;
   a slot extending from said first end a substantial distance axially along said body, said slot having a generally v-shaped cross-section in planes perpendicular to said axis and having a radial depth greater than the radius of the body;
   a hard cutting indexable insert mounted in said slot at the end thereof adjacent said first end of said body, said insert including first and second intersecting faces which define a continuous cutting edge that extends from the axis of said body to a point slightly beyond the radial extent of said body, all points along said cutting edge being axially outwardly of the first end of said body with the radially inner end of said cutting edge being located axially inwardly of its radially outer end to provide the drill with a negative lead, and the first face being positioned to provide the cutting edge with effective neutral rake.

2. The drill as defined in claim 1 wherein all points on said indexable insert are located radially inwardly of the radial outer end of said cutting edge.

3. The drill as defined in claim 1 wherein said indexable insert has the general shape of a parallelogram in the plane which includes said cutting edge and said axis, and the radially oute r end of said cutting edge is defined by an acute angle corner of said parallelogram.

4. The drill as defined in claim 1 wherein said cutting edge has a negative lead in the range of from approximately 1° to 5°.

5. The drill as defined in claim 1 wherein said indexable insert is removably received in a recess formed in said slot.

6. The drill as defined in claim 1 wherein a minor portion of the radially inner end of said cutting edge has a negative lead substantially greater than the remaining portion of said cutting adge and extending through said axis.

7. The drill as defined in claim 1 including means for directing a coolant fluid at the radial inner and outer end portions of said cutting edge.

8. The drill as defined in claim 3 including a radius formed on the acute angle corner located at the radially outer end of said cutting edge.

9. The drill as defined in claim 1 including a variable chip breaking groove configurations extending along said cutting edge from the axis radially outwardly to the radially outermost end of said cutting edge.

10. A drill comprising:
    an elongated, generally cylindrical body having a longitudinal axis and terminating in first and second axially opposite ends;
    a single flute defining groove extending from said first end a substantial distance axially along said body, and groove having a radial depth at least nearly as great as the radius of the body;
    a hard cutting indexable insert mounted in said groove at the end thereof adjacent said first end of said body, said insert defining a single continuous negative lead, effective neutral rake cutting edge which extends from the axis of said body to a point slightly beyond the radial extent of said body, all points along said cutting edge being axially outwardly of the first end of said body.

11. The drill as defined in claim 10 wherein all points on said indesable insert are located radially inwardly of the radial outer end of said cutting edge.

12. The drill as defined in claim 10 wherein said indexable insert has the general shape of a parallelogram in the plane which includes said cutting edge and said axis, and the radially outer end of said cutting edge is defined by an acute angle corner of said parallelogram.

13. A drill capable of performing a variety of metal removal operations including drilling from the solid, counterboring, facing, and turning, said drill comprising:

an elongated, generally cylindrical body, having a longitudinal axis and terminating in first and second axially opposed ends;

a single straight flute extending inwardly from said first end a substantial distance axially along said body, said flute having a generally V-shaped cross-section in planes perpendicular to said axis and having a radial depth greater than the radius of the body;

a carbide cutting insert mounted in said slot at the end thereof adjacent said first end of said body, said insert including first and second intersecting faces which define a continuous cutting edge that extends from the axis of said body to a point slightly beyond the radial extent of said body, all points along said cutting edge being axially outwardly of the first end of said body with the radially inner end of said cutting edge being located axially inwardly of its radially outer end to provide a negative lead, the first face being positioned to provide the cutting edge with effective neutral rake and the radially outer end of said cutting edge being located radially outwardly of said axis a distance greater than all other points on said insert and the radially inner end of said cutting edge having a negative lead substantially greater than the remaining portion of said cutting edge and intersecting said axis, at least a pair of openings provided in said body for directing separate streams of cooling fluid substantially directly at the radially inner end of said cutting edge and the radially outer end of said cutting edge, and said insert being received in a recess formed in the end of said flute, said recess having a depth such that the first face of said insert has a generally smooth transition with a surface of said flute to permit smooth exit of chips.

* * * * *